United States Patent [19]

Redman et al.

[11] Patent Number: 4,550,890

[45] Date of Patent: Nov. 5, 1985

[54] PIPE HANGER

[75] Inventors: James Redman, 847 Cleveland Ave., Amherst, Ohio 44001; Joseph E. Ellison, Vermillion, Ohio

[73] Assignee: James Redman, Amherst, Ohio

[21] Appl. No.: 422,157

[22] Filed: Sep. 23, 1982

[51] Int. Cl.⁴ .............................................. F16L 3/00
[52] U.S. Cl. ........................................ 248/59; 248/60; 248/62; 248/72; 24/278
[58] Field of Search .................. 248/58, 59, 60, 62, 248/74 PB, 72, 74 B; 411/417, 419; 24/19, 21, 275, 276, 277, 278, 484

[56] References Cited

U.S. PATENT DOCUMENTS

| 660,245 | 10/1900 | Bunte | 24/278 |
| 1,219,273 | 3/1917 | Elkin . | |
| 1,600,765 | 9/1926 | Kenyon | 24/278 |
| 1,840,216 | 1/1932 | Tormo | 248/72 |
| 2,452,186 | 10/1948 | Fluharty . | |
| 2,502,156 | 3/1950 | King | 24/276 |
| 2,554,478 | 5/1951 | Williams . | |
| 3,572,623 | 3/1971 | Lapp | 248/72 |
| 3,744,096 | 7/1973 | Kok | 24/278 |
| 4,019,705 | 4/1977 | Habuda, Sr. | 248/72 |
| 4,439,902 | 4/1984 | Huxtable | 24/278 |

FOREIGN PATENT DOCUMENTS

| 2255320 | 5/1974 | Fed. Rep. of Germany | 24/19 |
| 548537 | 1/1923 | France | 248/72 |
| 1584036 | 2/1981 | United Kingdom | 248/72 |

Primary Examiner—J. Franklin Foss
Assistant Examiner—Robert A. Olson
Attorney, Agent, or Firm—Harpman & Harpman

[57] ABSTRACT

A pipe hanger having a strap that extends around the pipe, the strap having teeth along each edge. A split sleeve and threaded nut assembly thread onto the ends of the strap and is positioned in an opening in a supporting clamp which is secured to a structural member.

1 Claim, 8 Drawing Figures

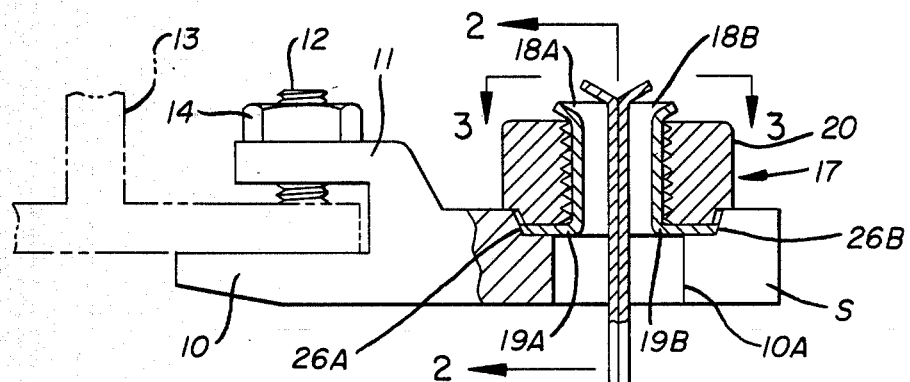
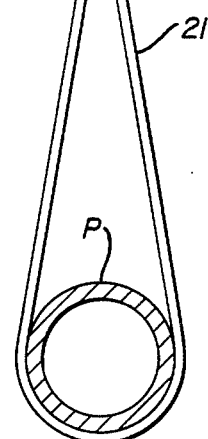
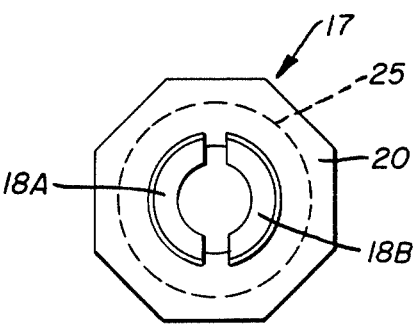
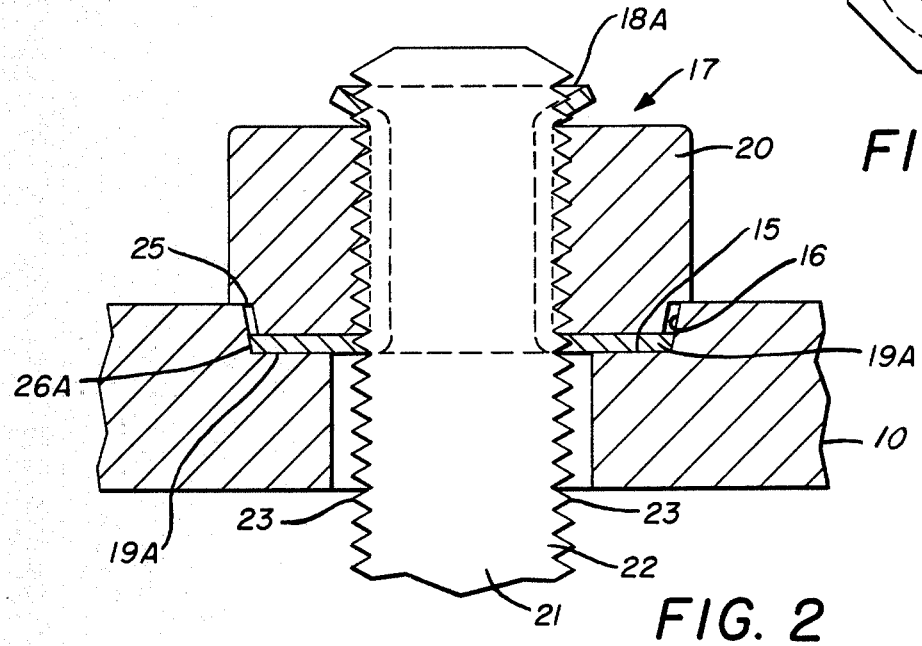
FIG. 1
FIG. 3
FIG. 2

PIPE HANGER

BACKGROUND OF THE INVENTION

(1) Technical Field

This invention relates to pipe hangers of the type used to support pipe such as those used in automatic sprinkler systems or the like. The pipe hangers are adjustable vertically when differentials in pipe support and attachment height are required.

(2) Description of the Prior Art

Prior devices of this type usually utilize an adjustable threaded fitting and rod with a fixed shape supported therefrom. Alternate approaches can be seen in U.S. Pat. Nos. 2,452,186, 2,554,478 and 1,219,273.

In U.S. Pat. No. 2,452,186, a saddle clamp structure is disclosed wherein the face of a strap is threaded and engages a nut on a formed post.

U.S. Pat. No. 1,219,273 discloses a band clamp wherein a strap has a reduced end and edges which are notched for engagement with a nut on a conical washer and bracket.

U.S. Pat. No. 2,554,478 on a hose clamp tool shows a strap with teeth formed along its edges that is pulled through a slit in a tubular jaw engaging a threaded nut positioned thereon. The jaw has a conical end which engages a tongue of a buckle through which the free end of the strap passes.

In applicant's device a two-piece sleeve is arranged within rotatable threaded nut for engagement within an aperture in a supporting clamp. A strap having teeth along both edges adjacent the ends thereof is positioned around a pipe; through the split sleeve engaging the threads of the nut. Placement of the sleeve and nut assembly within the clamp effectively holds the strap.

None of the prior art patents are capable of a similar action by the limiting nature of their design.

SUMMARY OF THE INVENTION

A pipe hanger having a strap with teeth continuously along both edges and adjacent its ends extends around a pipe, through a two-piece split sleeve and nut assembly registering therewith. A clamp has a slotted aperture therein which supports the sleeve and nut assembly in a holding action that allows an infinite adjustment of the strap and suspended pipe height and the positive locking of the same.

DESCRIPTION OF THE DRAWINGS

FIG. 1 is a side elevation of the pipe hanger with parts broken away and in cross section.

FIG. 2 is an enlarged section on line 2—2 of FIG. 1;

FIG. 3 is an enlarged top plan view of a portion of the pipe hanger on line 3—3 of FIG. 1;

DESCRIPTION OF THE PREFERRED EMBODIMENT

Figure 4:
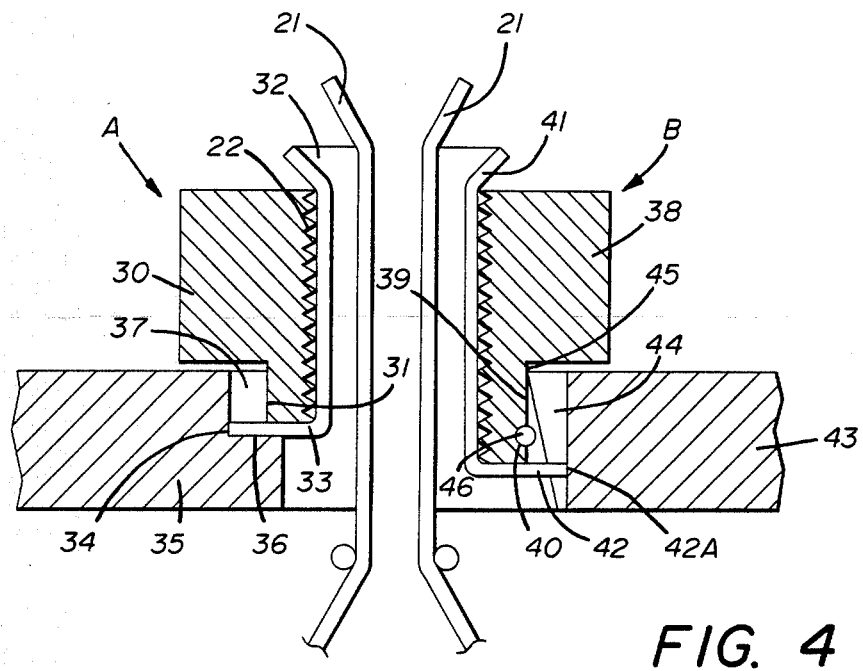
FIG. 4 is a cross sectional side elevational view of two alternative forms of the invention with parts broken away.

A pipe hanger for use in supporting various sizes of pipe comprises a clamp 10 seen in FIGS. 1 and 2 of the drawings having a vertically spaced horizontal member 11 adjacent one end with a threaded aperture therethrough. A threaded shaft 12 extends through said threaded aperture securing the clamp 10 to a structural member 13 shown in broken lines. A nut 14 on said threaded shaft 12 locks the same in place. A slot S extends inwardly from the opposite end of the clamp 10 to an aperture 10A having an annular shoulder 15 and outwardly tapered walls 16 defining an area of increased diameter. A locking nut assembly 17 comprises a two-piece sleeve 18A and 18B having half circular flanged lower ends 19A and 19B. The sleeves 18A and 18B have a space therebetween. The upper portions of the sleeves 18A and 18B extend above and over the nut 20 retaining the sleeves 18A and 18B loosely therein.

A strap 21 has a plurality of teeth 22 formed along its edges 23 and adjacent its ends. The strap 21 extends around a pipe P and back on itself at a point defined by an oval keeper ring 24. The ends of the strap 21 are positioned in the space between the sleeves 18A and 18B with the teeth 22 threadably engaging the nut 20 as best seen in FIG. 2 of the drawings, while the sleeves 18A and 18B maintain the strap 21 in workable vertical alignment. An annular shoulder 25 on the nut 20 adjacent the flanged lower ends 19A and 19B of the sleeves 18A and 18B defines an area of reduced diameter to permit rotation of the nut 20 relative to the clamp 10. The flanged lower ends 19A and 19B of the sleeves 18A and 18B are of a greater diameter than that of the area of reduced diameter of the nut 23 and have tapered edges 26A and 26B that are in wedging relation with the tapered walls 16 of the aperture 10A in the clamp 10 when the locking nut assembly 17 is seated therein.

In use, the strap 21 is placed around the pipe P and secured by the keeper ring 24. The locking nut assembly 17 is then threaded on the ends of the strap 21 which are together. The lock nut assembly 17 with the strap 21 attached is then aligned with the slot S so that the strap 21 passes therethrough and the locking nut assembly is seated within the aperture 10A in the clamp 10. Height adjustments can be made by rotating the nut 20 moving the strap 21 vertically therein. The seating of the lock nut assembly 17 abuts and wedges the tapered flanged lower edges of the two-piece sleeve 18A and 18B against the strap 21 helping to stabilize and lock the same in place.

An alternate assembly method uses a clamp 10 without a slot S wherein the strap 21 is positioned around the pipe P through the oval keeper ring 24 and through the aperture 10A. The lock nut assembly 17 is then threaded on the ends of the strap 21 with the lock nut assembly 17 seated within the aperture 10A. In both assemblies the ends of the strap 21 are bent apart.

The strap 21 can be formed in a number of predetermined lengths with performed teeth in the edges and adjacent its ends, or alternately cut to the required length from a quantity of strap on a reel, not shown.

Figure 5:
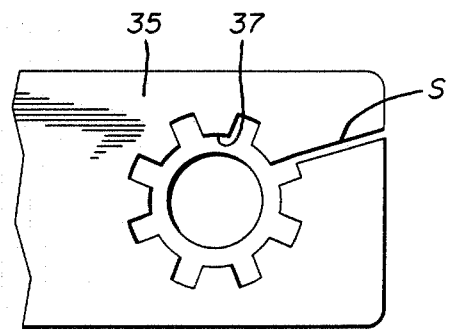
FIG. 5 is a top plan view of a clamp portion illustrating an alternate form with parts broken away.
Figure 6:
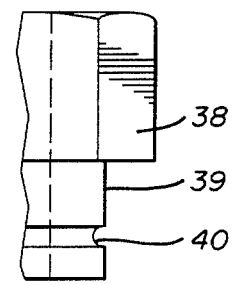
FIG. 6 is a side elevation of a portion of one alternate form of the invention with parts broken away.

Referring now to FIGS. 4, 5 and 6 of the drawings, two alternate forms of the lock nut assembly can be seen indicated by alternate A and alternate B.

In alternate A, a lock nut assembly has a threaded nut 30 with an area of reduced diameter at 31. A two-piece sleeve 32 has a half circular flanged lower end 33 which has notches 34. The sleeves 32 are positioned within the threaded nut 30 having an inner diameter to accommodate the sleeves 32 with a space therebetween. The upper portions of the sleeves 32 extend above and over the nut 30. The ends of the strap 21 are positioned between the sleeves 32 with the teeth 22 threadably engaging the nut 30. A clamp 35 has an opening and a shoulder 36 with a plurality of internal teeth 37 that correspond in spacing to the notches 34 on the sleeve 32 positioning the strap 21 in predetermined degree increments.

Referring to FIGS. 4 and 6 of the drawings, alternate B of the invention comprises a threaded nut 38 having an area of reduced diameter 39 with an annular groove 40 therearound. A two-piece sleeve 41 has half circular flanged lower ends 42 which have a plurality of notches 42A. The sleeve 41 and the strap 22 are positioned within the nut 38, the same as in alternate A. A clamp 43 has an opening with internal teeth 44 that taper inwardly defining an area of reduced diameter 45. A split ring 46 is of a diameter greater than that of the reduced area 45 and is positioned within the annular groove 40 locking the threaded nut 30 within the clamp 43.

Figure 7:
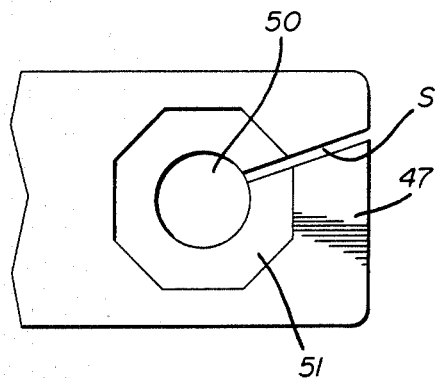
FIG. 7 is a top plan view of a clamp portion illustrating another alternate form with parts broken away.
Figure 8:
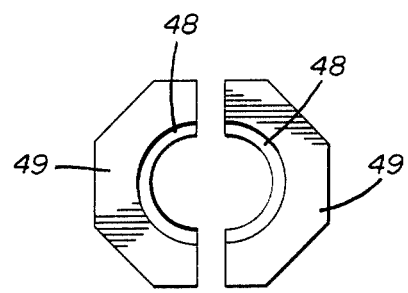
FIG. 8 is a top plan view of portions of an alternate form of a pair of sleeves used in the invention.

Referring now to FIGS. 7 and 8 of the drawings, a third alternate, alternate C, of the invention can be seen wherein a clamp 47 has been modified to engage a pair of sleeves 48 having octagonal-shaped lower flanges 49 that register with an opening 50 having a matching octangonal shoulder 51 around the opening 50 therein. A slot S in all three alternates extends outwardly from the openings 50 and offset from the center line of the clamps preventing the strap 21 from ever being in alignment with the slot S once the locking nut assembly is in place within the clamp as best seen in FIGS. 5 and 7 of the drawings.

It will thus be seen that a new and useful pipe hanger has been illustrated and described and it will be apparent to those skilled in the art that various changes and modifications may be made herein without departing from the spirit of the invention and having thus described out invention

What we claim is:

1. An improvement in a pipe hanger, said pipe hanger having a clamp with horizontally disposed vertically spaced members, one of which has a threaded opening for receiving a threaded bolt that extends toward the other member, the improvement comprising means in said clamp supporting the free ends of a strap adapted to encompass a pipe and holding said strap in non-rotating relation to said clamp, teeth on the edges of said strap, said free ends of said strap touching one another, said clamp having a vertically disposed aperture therein in spaced relation to said vertically spaced members, said means supporting said strap and holding said strap in non-rotating relation to said clamp including forming said vertically disposed aperture in upper and lower portions with a horizontally disposed shoulder therebetween, said upper portion having a larger diameter than said lower portion, the walls of said upper portion being tapered upwardly and outwardly, a nut, a pair of half sleeves positioned vertically through said nut, said half sleeves having oppositely disposed horizontally spaced vertical edges, outturned flanges on the lower ends of said half sleeves, said outturned flanges defining a greater diameter than said shoulder, said teeth on said free ends of strap engaging the threads in said nut so that elevating and rotating said nut moves said strap and said pipe vertically and releasing said nut wedges said outturned flanges on said tapered walls of said upper portion of said verticaly disposed aperture in said clamp.

* * * * *